United States Patent Office 2,917,703
Patented Dec. 15, 1959

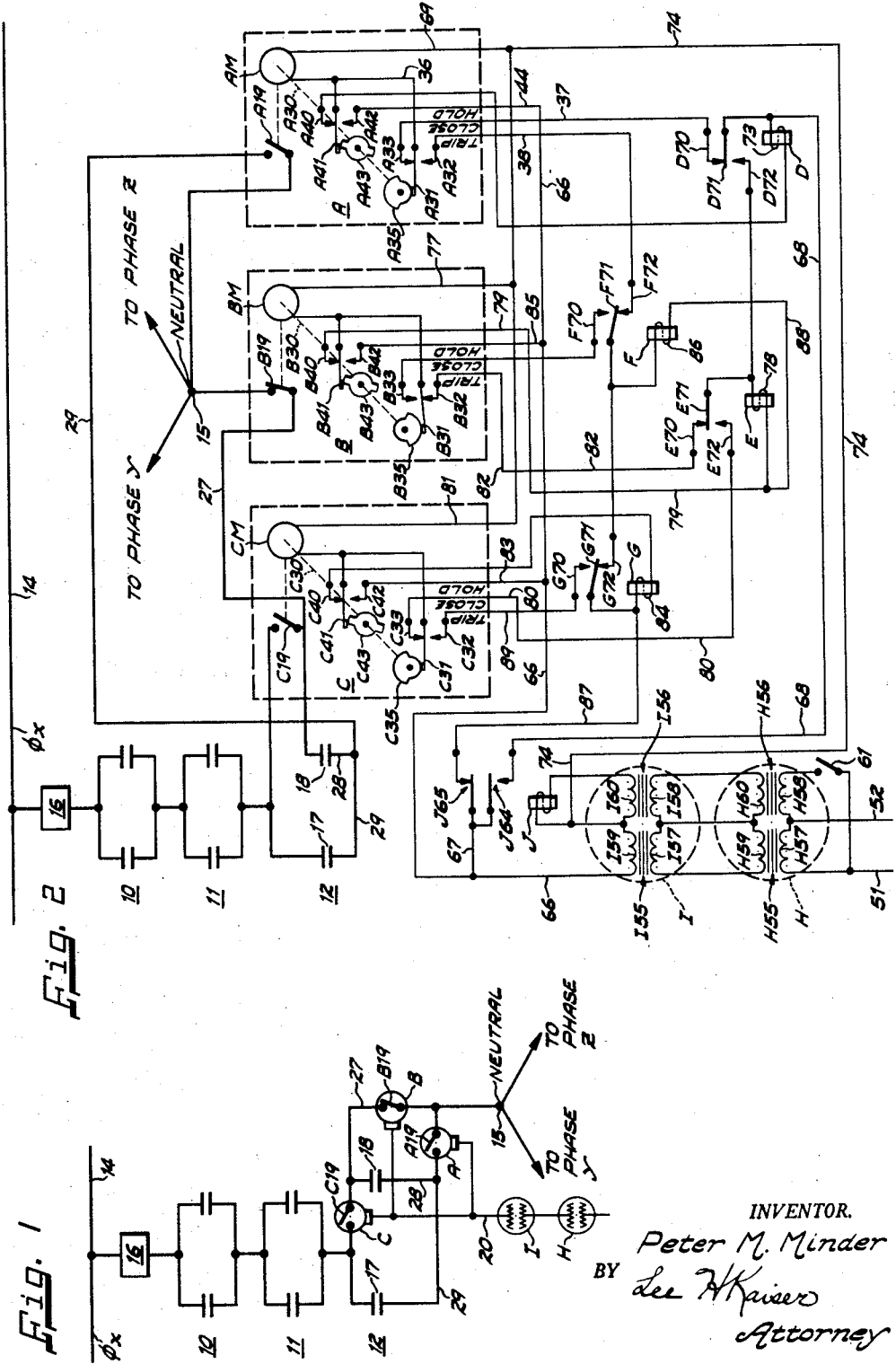

2,917,703

CAPACITOR SWITCHING CONTROL

Peter M. Minder, Reinach, near Basel, Switzerland, assignor to McGraw-Edison Company, Milwaukee, Wis., a corporation of Delaware Application September 16, 1957, Serial No. 684,153

8 Claims. (Cl. 323—122)

This invention relates to alternating current transmission and distribution lines and in particular to shunt capacitor banks for supplying reactive power to such lines.

Capacitors are frequently connected in shunt to alternating current transmission and distribution lines to relieve the power system of the need of carrying at least part of the reactive requirements of the load, i.e., to relieve the line and source equipment of wattless current. Changes in load demand require variations in the amount of capacitive reactance connected to the power system, and it is common practice to provide switching so that a large capacitor bank is connected to the power system as needed in several equal steps. Conventionally each step is provided with its own circuit breaker which switches at full phase to phase, or phase to neutral voltage and, in addition, must be capable of handling short circuit currents. The cost of a circuit breaker insulated for full line voltage for each step of a capacitor bank makes some capacitor installations prohibitively expensive.

In application Serial No. 402,296, filed January 5, 1954, in the name of Henry H. Strozier entitled "Voltage Divider for Switching Capacitors" and having the same assignee as the present invention, an arrangement for switching capacitors is disclosed with obviates the necessity of an expensive circuit breaker for each step of a capacitor bank. The series groups of capacitors of the first step are switched in shunt to the power system, preferably by an oil circuit breaker, in conventional manner. The capacitors of the first step are then utilized as a voltage divider, and the capacitors of succeeding steps are connected, by relatively low voltage switches, in parallel with capacitors of the first step at voltages which are only a fraction of the line voltage. The relatively low voltage switches of each step after the first are operated substantially simultaneously, and in a preferred embodiment isolating transformers are utilized to raise the electrical actuating signals for the low voltage switches to the potential level of the capacitors being switched.

An arrangement for switching a shunt capacitor bank is disclosed in my copending application Serial No. 546,132, filed November 10, 1955, now Patent No. 2,869,070, entitled "Arrangement for Varying Kilovar Output of Capacitor Bank in Steps" and having the same assignee as the present invention, wherein the capacitors are also connected to the power system at voltages which are only a fraction of the phase to phase, or phase to neutral, voltage, thereby obviating the necessity of an expensive circuit breaker for each step of the bank. In the arrangement disclosed in application Serial No. 546,132, now Patent No. 2,869,070, an impedance is connected in series with the capacitors of each step, except the first, of such a high value that the reactive volt-ampere output of the step is only a minor fraction of the rated kilovar output, and switching means are provided to short circuit the impedance when it is desired to increase the kilovars supplied to the power system. Preferably the first step of the capacitor bank is switched in a conventional manner by a circuit breaker, and the capacitors of each additional step are not normally disconnected from the power system but instead are, in effect, inactivated by the large impedance in series therewith. When the switching means of the additional step closes and short circuits the impedance in series with the capacitors of the step, rated kilovars are connected to the power system.

It is an object of the present invention to provide an improved arrangement for switching a shunt capacitor bank which obviates the necessity of an expensive circuit breaker for each step of the bank. It is a further object of the invention to provide such a capacitor switching arrangement which is more economical and requires less equipment than the aforementioned voltage divider arrangement of application Serial No. 402,296.

A further object of the present invention is to provide a capacitor bank switching arrangement which is an improvement over that disclosed in my aforementioned application Serial No. 546,132, now Patent No. 2,869,070, in that a portion of the series group nearest the neutral is utilized as the impedance in series with the capacitors. Still another object is to provide such a capacitor switching arrangement wherein the capacitors constituting this impedance are connected in parallel with other capacitors of the series group nearest the neutral to increase the kilovar output of the bank. Another object is to provide such a capacitor switching arrangement which is particularly suitable for switching capacitor banks having two, three, or four series groups. A still further object of the invention is to provide such a capacitor switching arrangement having means for interlocking the switches to assure the desired sequence of operation.

Other objects and advantages of the invention will be apparent from the following description when taken in conjunction with the accompanying drawing wherein:

Fig. 1 is a schematic circuit diagram of one phase of a capacitor bank switched in accordance with the invention; and Fig. 2 is a schematic circuit diagram of a preferred arrangement for interlocking the capacitor switches of the arrangement of Fig. 1 to assure the desired sequence of operation thereof, the circuit being shown with relays F and G operated and relays D and E released.

Referring to the drawing, Fig. 1 schematically illustrates a capacitor bank having three series groups 10, 11 and 12 of paralleled capacitors adapted to be connected in shunt between conductors 14 and 15 which may be line conductors of a single phase or a polyphase transmission or distribution line, or may, as shown, be a phase conductor and neutral of a polyphase power system, for example a 34.5 kilovolt power system. Only the capacitors of a single phase X of the polyphase system are shown in Fig. 1, and it will be understood that the capacitor bank will also comprise phases Y and Z similar to phase X and connected in Y to define neutral 15. However, the invention is also applicable to a delta connected capacitor bank.

It will be appreciated that each series group 10, 11 and 12 may comprise any desired number of capacitor units, two capacitor symbols being shown in each series group 10, 11 and 12 in the drawing, and the term "capacitor" is used hereinafter in the description and in the appended claims to connote any desired value of capacitance.

The serial arrangement of groups 10, 11 and 12 is preferably connected in shunt between phase conductor 14 and neutral 15 by a circuit breaker 16, and it will be understood that the circuit breaker 16 will also be provided with contacts for connecting the series groups in phases Y and Z between the corresponding phase conductors and the neutral 15. In order to interrupt the current to the capacitors of series groups 10, 11 and 12 with a minimum of restriking, the circuit breaker 16 is preferably of the oil-filled type. Prior art installations in which an oil-filled circuit breaker insulated for full line voltage was required for each step of the capacitor bank were unnecessarily expensive.

The series group 12 nearest the neutral 15 is preferably of the same total capacitance as the series groups 10 and 11 and is arranged in two sets 17 and 18 of capacitor units, preferably of equal capacitance. In accordance with the invention the two sets of capacitors 17 and 18 are "re-grouped" to vary the total impedance of the capacitor bank and thus change the kilovar output of the bank. When the rated kilovars of the capacitor bank are being supplied to the power system, the two sets 17 and 18 of capacitors are connected in parallel so that the series group 12 represents the same impedance as the series groups 10 and 11. If it is desired to reduce the kilovar output of the bank to one-half its rated value, the two sets 17 and 18 of capacitors are "re-connected" in series so that the impedance of the capacitor bank is increased and the kilovar output of the bank correspondingly decreased.

An electrical switch C, insulated for less than phase to neutral voltage, is adapted when its contacts C19 are closed to connect the two sets 17 and 18 of capacitors in parallel, and a similar electrical switch A is adapted, when its contacts A19 are closed, to connect the paralleled sets 17 and 18 of capacitors to the neutral 15. A third electrical switch B, similar to switches A and C, is adapted when its contacts B19 are closed (assuming switches A and C are open) to connect the two sets 17 and 18 of capacitors in serial relation with the series groups 10 and 11 between the phase conductor 14 and the neutral 15. Although switches A, B, and C are insulated for less than phase to neutral voltage, these switches are mounted on the capacitor rack frame which itself is insulated from ground, and consequently adequate insulation to ground is provided for the switches A, B and C. The switches A, B and C are preferably of the latch trip, or snap action, type having contacts 19 immersed in a liquid dielectric (not shown), and a commercially available electrical switch, adapted to be operated either manually or mechanically by an operating handle or electrically by actuating signals from a remote location, suitable for the purposes of the invention is disclosed in U.S. Patent 2,671,141 to William J. Weinfurt having the same assignee as the present invention.

Conventionally each of the switches A, B and C is controlled by actuating signals over three wires (as shown in Fig. 2), and in order to simplify the wiring diagram of Fig. 1 and to facilitate the understanding of the invention, the motor operating mechanism of the switches A, B and C is omitted from the wiring diagram of Fig. 1 and it is schematically illustrated that these switches are simultaneously actuated by control signals supplied over a control lead 20 and raised to the potential lever of the switches by insulating transformer means. If the power system of Fig. 1 is of the 34.5 kilovolt class having a phase to netural voltage of $34.5/\sqrt{3}$ equals approximately 20 kilovolts and commercially available insulating transformers insulated for 15 kilovolts are utilized, preferably two insulating transformers H and I will be utilized in cascade to raise the actuating signals to the potential level of the switches A, B and C.

When rated kilovar output of the capacitor bank is being supplied to the power system, contacts C19 and A19 are closed and contacts B19 are open. In this condition, sets 17 and 18 of capacitors are connected in parallel by switch C, and these paralleled sets 17 and 18 of capacitors are connected to neutral 15 by switch A. If it is desired to reduce the reactive volt-amperes supplied to the power system to half rated value, a control signal is supplied over lead 20 and raised to the potential level of the switches A, B and C by insulating transformers H and I to operate the switches in the following sequence:

Switch C opens
Switch B closes
Switch A opens

The means for interlocking the switches and accomplishing the desired sequence of operations is illustrated in Fig. 2 and described in detail hereinafter. It will be understood that control signals will also be supplied to simultaneously operate switches in phases Y and Z similar to switches A, B and C in phase X.

Opening of switch contacts C19 disconnects set 18 from its parallel arrangement with set 17, and this switching is accomplished at a voltage which, in the illustrated embodiment, is only ⅓ of phase to neutral voltage. Closure of switch contacts B19 connects one side of set 18 of capacitors to neutral 15, and opening of switch contacts A19 removes the short circuit from set 18 and results in sets 17 and 18 of capacitors being in series with each other (assuming switch C is open) and with the series groups 10 and 11. This circuit may be traced from neutral 15, closed contacts B19, conductor 27, set 18 of capacitors, conductor 28, conductor 29, set 17 of capacitors, series group 11, series group 10, and phase conductor 14.

If it is desired to increase the number of kilovars connected to the power system to the rated kilovar output of the capacitor bank, a control signal is supplied over the lead 20 to operate the switches in the following sequence:

Switch A closes
Switch B opens
Switch C closes

Switch A in closing short circuits capacitor set 18 through the closed contacts B19. This switching is accomplished at a voltage which is only one-third of the phase to neutral voltage. Switch B in opening disconnects one side of capacitor set 18 from the neutral 15 and removes the short circuit from capacitor set 18. Switch C in closing contacts C19 connects sets 17 and 18 of capacitors in parallel so that series group 12, comprising sets 17 and 18, is connected in a serial arrangement with series groups 10 and 11 and in shunt to the power system in a circuit which may be traced from neutral 15, closed contacts A19, the sets 17 and 18 of capacitors which are paralleled by the closed contacts C19, series group 11, series group 10, and phase conductor 14.

If switches A and B were ever open at the same time, the last of these two switches to open would be required to interrupt phase to neutral voltage, which may be beyond its insulated rating, and to assure the desired sequence of switch operation, means for interlocking the switches A, B and C are preferably provided. Although such interlocking means may be mechanical or hydraulic, the preferred arrangement illustrated in the wiring diagram of Fig. 2 utilizes electrical means.

As disclosed in the aforementioned Patent 2,671,141 to William J. Weinfurt, to which reference is made for details of construction, each low voltage switch A, B and C comprises a pair of main contacts 19 immersed in a liquid dielectric (not shown) and movable between open and closed position when a unidirectional motor M is actuated. All three switches A, B and C are identical and only the wiring circuit of switch A will be described. In the drawing like parts of relays and switches A, B, C, D, etc. are given the same reference numerals, the letters A, B, C, etc. designating the switch or relay embodying the part. Switch A includes a unidirectional motor AM which rotates a shaft A30 through a half revolution to accomplish opening or closing of the main contacts A19. At the end of 180 degree rotation a limit switch, including movable contact A31, is opened to de-energize motor AM. The movable contact A31 and cooperable stationary contact A33 comprise one limit switch to open the circuit to motor AM after the main contacts A19 are closed; the movable contact A31 and cooperable stationary contact A32 comprise a second limit switch to open the circuit to motor AM after the main contacts A19 are opened. The movable contact A31 is resiliently biased into engagement with stationary contact A33, and a cam A35 on the shaft A30 is adapted to actuate movable contact A31 out of engagement with stationary contact A33 and into engagement with stationary contact A32 when the main switch contacts A19 are closed. When shaft A30 is rotated through 180 degrees to open main contacts A19, cam A35 is rotated in a direction to permit movable contact A31 to engage stationary contact A33. The limit switch comprising contacts A31—A33 opens the circuit over lead 36 from the motor AM to the "close" lead 37, and closure of contacts A31—A32 connects this lead 36 to the "trip" lead 38 after the motor AM has rotated shaft A30 through half a revolution to close main contacts A19. When the motor AM is subsequently energized to rotate shaft A30 through 180 degrees to open the main contacts A19, the limit switch comprising contacts A31—A32 opens the circuit over the lead 36 from the motor AM to the "trip" lead 38, and the limit switch comprising contacts A31—A33 connects the motor AM through lead 36 to the "close" lead 37.

A holding switch including movable contact A41 resiliently biased into engagement with cooperable stationary contact A42 is normally held by a cam A43 on the shaft A30 in engagement with cooperable stationary contact A40. After the motor AM initiates rotation of the shaft A30, cam A43 permits movable contact A41 to move out of engagement with stationary contact A40 and into engagement with stationary contact A42. The holding switch A41—A42 connects the lead 36 from the motor AM to the "hold" lead 44 to by-pass the limit switches A31—A32 and A31—A33 and keep the motor AM energized until it completes a half revolution of shaft A30 even though an actuating signal is removed from the "trip" lead 38 or the "close" lead 37.

Four interlocking relays D, E, F, and G assure the desired sequence of operation of switches A, B and C. Relays D and E are operated when it is desired to connect the sets 17 and 18 of capacitors in parallel to increase the reactive volt amperes connected to the system; relays G and F are operated when it is desired to decrease the kilovar output of the bank. The interlocking relays D, E, F and G operate on relatively low voltage signals, e.g., 120 volts A.C., and control the low voltage power source supplied over leads 51 and 52 for energizing the motor operating mechanisms M of switches A, B and C. However, the relays D, E, F and G are mounted on a framework which is isolated from ground, preferably on the same framework as the switches A, B and C, and the insulating transformers H and I raise the low voltage power source and the control signals to the potential level of the relays D, E, F and G and switches A, B and C.

In the preferred embodiment of the invention each insulating transformer H and I includes two separate one-to-one ratio core and coil assemblies 55 and 56, preferably of the fifteen kilovolt insulation class. The two cascaded transformers H and I are identical, and only transformer H will be described. One terminal of each of the primary windings H57 and H58 of the core and coil assemblies H55 and H56 are connected together, and similarly one side of each of the secondary windings H59 and H60 are electrically commoned. A low voltage alternating current source, for example, 120 volts, supplied over leads 51 and 52 energizes primary winding H57, inducing a voltage of substantially the same magnitude in secondary winding H59, which voltage is transformed by insulating transformer I. The output voltage from the secondary winding I59 of insulating transformer I is connected by the contacts of the interlocking relays D, E, F and G to the motor mechanisms M of switches A, B and C in order to control the sequence of operation of switches A, B and C.

Assume that the main contacts A19 and C19 of low voltage switches A and C are open and that main contacts B19 of switch B are closed as illustrated in Fig. 2 of the drawing, which condition exists when sets 17 and 18 of capacitors are connected in series and the kilovar output of the capacitor bank is one-half its rated value. In this condition, relays F and G are operated as will appear hereinafter in the description. A transfer switch 61, which may be controlled either manually or automatically, is adapted when closed to connect the low voltage source of power over leads 51 and 52 to the primary winding H58 of insulating transformer H. The resulting voltage induced in secondary winding I60 of insulating transformer I energizes the operating coil of relay J which closes its normally open contacts J64 and opens its normally closed contacts J65. Opening of contacts J65 interrupts the energizing circuits to coil 84 of relay G and coil 86 of relay F, causing these relays to release. Closure of contacts J64 connects the voltage output from the secondary winding I59 to the operating motor AM of switch A through the contacts of limit switch A31—A33 in a circuit which may be traced from one side of secondary winding I59, conductor 66, conductor 67, contacts J64, conductor 68, contacts D71—D70 of relay D, contacts A31—A33, conductor 36, motor AM, conductor 69, and conductor 74 to the opposite side of winding I59. Motor AM rotates shaft A30 in a direction to close its main contacts A19, and the initial rotation of shaft A30 closes contacts A41—A42 to connect lead 36 from motor AM directly to "hold" lead 44 and thus by-pass the limit switch A31—A33. After shaft A30 has rotated through half a revolution to close main contacts A19, contacts A41—A40 are closed by cam A43 to complete an energizing circuit to the coil 73 of relay D in series with the motor AM in a circuit which may be traced from one side of secondary winding I59, lead 66, lead 67, contacts J64, conductor 68, coil 73 of relay D, contacts A40—A41, motor AM, lead 69 and lead 74 to the other side of secondary winding I59. Motor AM cannot rotate shaft A30 when it is energized in series with coil 73 of relay D. However, relay D operates to open contacts D70—D71 and close contacts D71—D72 to complete a circuit to trip switch B in a circuit which may be traced from one side of secondary winding I59, lead 66, lead 67, contacts J64, lead 68, contacts D71—D72, contacts E71—E70, "trip" lead 82, closed contacts of limit switch B32—B31, motor BM, lead 77 and lead 74 to the opposite side of winding I59. Motor BM rotates shaft B30 to open its main contact B19 and cam B43 on shaft B30 closes contacts B41—B42 to complete a holding circuit to motor BM over hold lead 85 and conductor 66. After shaft B30 has rotated through one half revolution, contacts B41—B40 are closed to complete a circuit to energize coil 78 of relay E in series with motor BM, which circuit may be traced from one side of secondary winding I59, conductor 66, conductor 67, contacts J64, conductor 68, contacts D71—D72, coil 78, conductor 79, contacts B40—B41, motor BM, lead 77 and lead 74 to the opposite side of winding I59. Motor BM cannot rotate shaft B30 when it is energized in series with coil 78 of relay E. However, relay E operates and closes its contacts E71—E72 to complete an energizing circuit to motor CM of switch C through the closed contacts C33—C31 in a circuit that may be traced from one side of secondary winding I59, conductor 66, conductor 67, contacts J64, conductor 68, contacts D71—D72, contacts E71—E72, over the "close" lead 80 and contacts of limit switch C33—C31, motor CM, conductor 81 and conductor 74 to the opposite side of secondary winding I59. Motor CM rotates shaft C30 to close the main contacts C19.

It will thus be seen that the switches are operated in the following sequence:

Switch A closes
Switch B opens
Switch C closes to parallel the sets 17 and 18 of capacitors and thus increase the kilovar output of the capacitor bank. It will be noted that when rated kilovolt amperes are being supplied to the power system, the position of switches A, B and C and relays D, E, F and G is reversed from that shown in Fig. 2, switches A and C being closed and relays D and E being operated.

When it is desired to decrease the number of reactive volt amperes supplied to the power system, the switch 61 is opened to remove the alternating current power source over leads 51 and 52 from primary winding H58. Relay J releases and opens its contacts J64, to permit relays D and E to open, and closes its contacts J65 to complete an operating circuit to the motor CM to open the main contacts C19 of switch C in a circuit which may be traced from one side of secondary winding I59, conductor 66, conductor 67, closed contacts J65, conductor 87, contacts G71—G70, the "trip" lead 89, closed contacts of limit switch C32—C31, motor CM, conductor 81 and conductor 74 to the opposite side of secondary winding I59. Motor CM rotates shaft C30 to open its main contacts C19 and cam C43 closes contacts C41—C42 to complete a holding circuit from motor CM over "hold" lead 83 to lead 66 to by-pass the limit switch C32—C31. After the main contacts C19 are opened, contacts C41—C40 close to complete an energizing circuit for the coil 84 of relay G in series with motor CM of switch C. When motor CM is energized in series with coil 84 of relay G it cannot rotate shaft C30. However, relay G operates and closes contact G71—G72 to complete an energizing circuit to motor BM through contacts F71—F70 of relay F and closed limit switch contacts B33—B31. Motor BM rotates shaft B30 in a direction to close main contacts B19, and after initial rotation of shaft B30, cam B43 closes contacts B41—B42 to provide a holding circuit for motor BM over "hold" lead 85 directly to lead 66. After shaft B30 has rotated through 180 degrees to close its main contacts B19, contacts B40—B41 close to complete an energizing circuit to the coil 86 of relay F in a circuit which may be traced from one side of secondary winding I59, lead 66, lead 67, closed contacts J65, lead 87, contacts G71—G72, coil 86, conductor 88, conductor 79, contacts B40—B41, motor BM, conductor 77 and conductor 74 to the opposite side of secondary winding I59.

In operating, relay F closes contacts F71—F72 to complete an energizing circuit to motor AM over the "trip" lead 38 through the closed contacts of limit switch A32—A31. Motor AM rotates shaft A30 to open main contacts A19, and after initial rotation of shaft A30, cam A43 closes contacts A41—A42 to complete a holding circuit directly from motor AM over "hold" lead 44 to conductor 66 thereby shunting the limit switch comprising contacts A31—A32 and assuring that the motor AM will rotate shaft A30 until the main contacts A19 are open.

It is thus seen that the interlocking relays G and F assure the operation of low voltage switches in the desired sequence:

Open switch C
Close switch B
Open switch A to connect sets 17 and 18 of capacitors in serial relation with series groups 11 and 10 and thus reduce the reactive kilovolt amperes supplied to the system.

The switching arrangement of the invention requires fewer isolating transformers for raising the actuating signals to the level of the electrical switches than the system disclosed in the aforementioned application Serial No. 402,296, and consequently permits material reduction in the cost of the capacitor bank.

Although only a single embodiment of the invention intended for a polyphase power system has been described and illustrated, it will be appreciated that the invention is also applicable to single phase systems and that many modifications and variations will be apparent to those skilled in the art, and consequently it is intended in the appended claims to cover all such variations and modifications as fall within the true spirit and scope of the invention.

What I claim as new and desire to secure by Letters Patent of the United States is:

1. In an alternating current power system, in combination, a capacitor bank including at least two series groups of capacitors, each of said groups comprising a plurality of capacitor units connected in parallel, the capacitor units of one of said groups being divided into two sets, said sets being connected in series with each other and in series with the other series groups of said bank, first electrical switch means adapted when closed to connect the serial arrangement of said sets and series groups in shunt to said power system, second electrical switch means adapted when closed to connect said two sets in parallel, third electrical switch means adapted when closed and said first switch means is open and said second switch means is closed to connect the serial arrangement of said paralleled sets and said other series groups in shunt to said power system, said switch means being on the same insulation level as the capacitors of said one group, and control means at said insulation level for actuating said electrical switch means in the sequence (1) said third switch means closes (2) said first switch means opens and (3) said second switch means closes when the reactive kilovars supplied to said system are to be increased and in the reverse sequence when the kilovolt amperes are to be decreased, said switch actuating control means interlocking said electrical switch means so that said first and third switch means cannot open simultaneously.

2. In combination with an alternating current power line, a capacitor bank having at least two series groups of capacitors, each of said groups comprising a plurality of capacitor units connected in parallel, said capacitor units of one of said groups being divided into two sets connected in series with each other and in series with the other series groups of said bank, first electrical switch means for connecting the serial arrangement of said sets and said series groups to one side of said line and in shunt to said line, second electrical switching means for connecting the junction of said first switching means and the set nearest said one side of said line to the junction of said one series group with said other series groups of said bank, third electrical switching means for short circuiting between said one side of said line and the junction of said two sets, a single isolating transformer coupling means for raising a low voltage source of power to the insulation level of said switching means, and relay means at the insulation level of said switching means actuated from the output of said isolating transformer means and controlled by signals applied to the input thereof for energizing said electrical switch means from the output of said isolating transformer means in the sequence (1) said third switching means closes (2) said first switching means opens and (3) said second switching means closes when the reactive kilovolt-amperes supplied to said system are to be increased and in the reverse sequence when the kilovolt-amperes are to be decreased and for interlocking said electrical switch means to prevent simultaneous opening of said first and third switching means.

3. In combination with an alternating current power line, at least two series groups of capacitors, each of said series groups comprising a plurality of paralleled capacitor units, the capacitor units of one of said series groups being divided into two sets connected in series with each other and in series with the other series groups, normally closed first electrical switching means for connecting the serial arrangement of said sets and said groups to one side of said line and in shunt to said line, second electrical switching means for connecting the junction of said first switching means and the set nearest said one side of said line to the junction of said one series group with said other series groups, third electrical switching means for short circuiting between said one side of said line and the junction of said sets, and means for operating said switching means in the sequence of (1) said third switching means closes (2) said first switching means opens and (3) said second switching means closes when the reactive kilovolt-amperes supplied to said system are to be increased and in the reverse sequence when the kilovolt-amperes are to be decreased, said switch operating means interlocking said switching means so that said first and third switching means cannot open simultaneously.

4. In combination with an alternating current power system, a capacitor bank including a plurality of series groups of paralleled capacitors, the paralleled capacitors of one series group being divided into two sets connected in series with each other and in series with the other series groups, three electrically actuated switches isolated from ground and adapted to be operated from a low voltage electrical power source, the first switch being adapted when in closed position to connect the serial arrangement of said series groups and said sets in shunt to said power system, the second switch being adapted when closed to connect said two sets in parallel, and the third switch adapted when closed and said first switch is open and said second switch is closed to connect the serial arrangement of said paralleled sets and said other series groups in shunt to said power system, isolating transformer means having a first pair of windings including an input winding adapted to be energized from said low voltage source of electrical power and an output winding inductively coupled thereto, whereby said low voltage source of power may be raised to a higher insulating level, said isolating transformer means also having a second pair of windings, and means controlled at the potential of said low voltage source of power and including said second pair of windings for selectively energizing said electrically operated switches from the electrical power derived from said output winding.

5. In combination with a polyphase alternating current power system, a capacitor bank comprising a plurality of branches connected in star to define a neutral, each branch including at least two series groups of paralleled capacitors, the paralleled capacitors of one of said groups being divided into two sets connected in series with each other and in series with the other series groups, first electrically actuated switching means adapted when closed to connect the serial arrangement of said groups and said sets to said neutral, second electrically actuated switching means adapted when closed to connect the junction of said first switching means and the set nearest the neutral to the juncture of said one series group and the remaining series groups, third electrically actuated switching means adapted when closed to connect the junction of said sets to said neutral, said switching means being at the insulation level of the capacitors of said one group, and control means at said insulation level for interlocking the switching means of said branch to operate said switches in the sequence of (1) said third switching means closes (2) said first switching means opens and (3) said second switching means closes when the reactive kilovolt-amperes supplied to said system to be increased and in the reverse sequence when the reactive kilovolt-amperes are to be decreased, and means including isolating transformer means for actuating said control means in all of said branches approximately simultaneously.

6. In combination with a polyphase alternating current power system, a capacitor bank comprising a plurality of branches connected in star to define a neutral, each branch including at least two series groups of paralleled capacitors, the paralleled capacitors of the series group nearest said neutral being divided into two sets connected in series with each other and in series with the other series groups, each branch also including first electrical switching means adapted when closed to connect the serial arrangement of said group and said sets to said neutral, second electrical switching means adapted when closed to connect the junction of said first switching means and said set nearest the neutral to the juncture of said one series group and the remaining series groups, third electrical switching means adapted when closed to connect the junction of said sets to said neutral, a single isolating transformer coupling means for raising a low potential source of power to the insulation level of said switching means, and control means at the insulation level of said switching means actuated from the output of said isolating transformer means and controlled by signals applied to the input thereof for controlling the energization of said switching means of said branch in a predetermined sequence from the output of said isolating transformer means and for interlocking the switching means of said branch to prevent simultaneous opening of said first and third switching means; said control means in all of said branches being operated approximately simultaneously by signals applied to the input of said isolating transformer coupling means of all of said branches.

7. In combination with an alternating current power line, a capacitor bank including at least two series groups of paralleled capacitors connected in shunt to said line, the paralleled capacitors of one of said series groups being divided into two sets, said sets being connected in series with each other and with the other series groups, first electrically actuated switching means for short circuiting between one side of said power line and the junction of said sets, second electrically actuated switching means for disconnecting from said one side of said power line the set short circuited by actuation of said first switching means, third electrically actuated switching means for reconnecting said disconnected capacitor to the junction of said one series group and the other series groups, means for insulating said switching means relative to ground, isolating transformer means having an input winding adapted to be energized from a low voltage source of electrical power and an output winding inductively coupled to said input winding, whereby said power source may be raised to a higher insulating level, and means controlled at the insulating level of said low voltage source of power for selectively energizing said electrically actuated switching means from the electrical power derived from said output winding.

8. In cmbination with an alternating current power line, a capacitor bank having a plurality of serially arranged capacitors connected in shunt to said power line, a plurality of electrically actuated switches adapted when operated in a predetermined sequence to connect adjacent ones of said serially arranged capacitors in parallel, whereby the kilovar output supplied by said capacitor bank to said power line may be varied, each of said switches being insulated for less than the voltage of said power line, said adjacent capacitors and said switches being on the same insulation level, a single isolating transformer coupling means for raising a low potential source of power to said insulation level, and control means at said insulation level actuated from the output of said isolating transformer means and controlled by signals applied to the input thereof for energizing said switches in said predetermined sequence.

References Cited in the file of this patent

UNITED STATES PATENTS 2,295,388  Cuttino _____ Sept. 8, 1942
2,802,171  Minder _____ Aug. 6, 1957